United States Patent [19]

Castillo et al.

[11] Patent Number: 5,804,961
[45] Date of Patent: Sep. 8, 1998

[54] MAGNETOSTRICTIVE WAVEGUIDE POSITION MEASUREMENT APPARATUS USING PIEZOELECTRIC SENSOR

[75] Inventors: Giancarlo Castillo, Ferndale, Mich.; Jody Page, Raleigh; James Webb, Garner, both of N.C.; John D. Begin, Sterling Heights; Richard D. Koski, Troy, both of Mich.

[73] Assignee: Patriot Sensors & Control, Corp., Clawson, Mich.

[21] Appl. No.: 740,330

[22] Filed: Oct. 28, 1996

[51] Int. Cl.⁶ ..................................................... G01B 7/14
[52] U.S. Cl. ................. 324/207.13; 324/207.22; 324/207.24
[58] Field of Search ......................... 324/207.13, 207.22, 324/207.24; 364/571.01–571.05; 367/127, 902; 73/290 V, 314; 333/148

[56] References Cited

U.S. PATENT DOCUMENTS

| | | | |
|---|---|---|---|
| 3,703,681 | 11/1972 | Johnson et al. | 324/249 |
| 3,898,855 | 8/1975 | Tellerman | 324/207.13 |
| 4,678,993 | 7/1987 | Vinnemann et al. | 324/207.13 |
| 4,709,210 | 11/1987 | Pond | 324/207.13 |
| 4,839,590 | 6/1989 | Koski et al. | 324/209 |
| 4,939,457 | 7/1990 | Tellerman | 324/207.13 |
| 4,943,773 | 7/1990 | Koski et al. | 324/207.13 |
| 4,958,332 | 9/1990 | Tellerman | 324/207.13 |
| 5,017,867 | 5/1991 | Dumais et al. | 324/207.13 |
| 5,050,430 | 9/1991 | Begin et al. | 324/207.13 |
| 5,076,100 | 12/1991 | Hunter et al. | 324/207.21 |
| 5,173,658 | 12/1992 | Astrachan et al. | 324/207.12 |
| 5,196,791 | 3/1993 | Dumais | 324/207.13 |
| 5,212,444 | 5/1993 | Abramovich et al. | 324/207.13 |
| 5,258,707 | 11/1993 | Begin et al. | 324/207.13 |
| 5,274,328 | 12/1993 | Begin et al. | 324/207.12 |
| 5,313,160 | 5/1994 | Golden et al. | 324/207.13 |
| 5,406,200 | 4/1995 | Begin et al. | 324/207.13 |
| 5,412,316 | 5/1995 | Dumais et al. | 324/207.13 |
| 5,473,245 | 12/1995 | Silvus, Jr. et al. | 324/207.13 |
| 5,545,984 | 8/1996 | Gloden et al. | 324/207.13 |

OTHER PUBLICATIONS

Defination of Piezo Film Polarity, AMP Inc Appln. Note 65773, Published Feb. 1, 1994, Revision B.
Retention of PVDF Piezo Activity, AMP, Inc., Appln Note 65802, Published Feb. 1, 1994, Revision B.
Piezo Film Sensors Technical Manual (pp. 7, 21–31), AMP. Inc, Appln Note 65751, Published Dec. 1993.
Wire Lead Attach–DT1 Sensor LDT 1–028K, AMP Inc., Instruction Sheet 408–9939, Pub. Mar. 1, 1994, Revision C. p. 1.
The Piezoelectric Effect, Application Notes, Piezo Kinetics Inc p. 8.

Primary Examiner—Sandra L. O'Shea
Assistant Examiner—Jay M. Patidar
Attorney, Agent, or Firm—Young & Basile, P.C.

[57] ABSTRACT

A magnetostrictive waveguide position measuring apparatus includes a waveguide extending between opposed anchored ends. A magnet is displaceable along the waveguide and generates torsional strain in the waveguide in response to an electrical excitation signal transmitted along the waveguide. A piezoelectric film element is coupled to the waveguide to sense the torsional strain signal on the waveguide. A signal processor determines the relative elapsed time between the excitation signal and the output signal of the piezoelectric film element to determine the position of the magnet along the waveguide. The piezoelectric film element is coupled to the waveguide along an axis transverse to the axis of stretch of the element. Alternately, a differential piezoelectric film element formed of two piezoelectric elements contacts a waveguide, with the two elements connected in differential parallel or series configuration and in or out of phase to double the output current or the output voltage. The output of the differential piezoelectric elements are connected to an amplifier in either charge or voltage mode for noise, EMI and transient signal suppression.

16 Claims, 5 Drawing Sheets

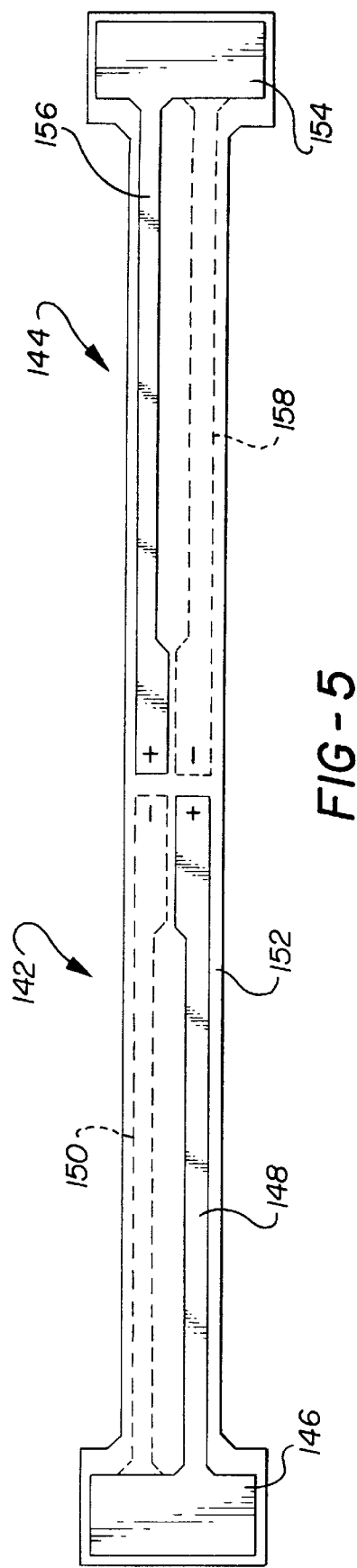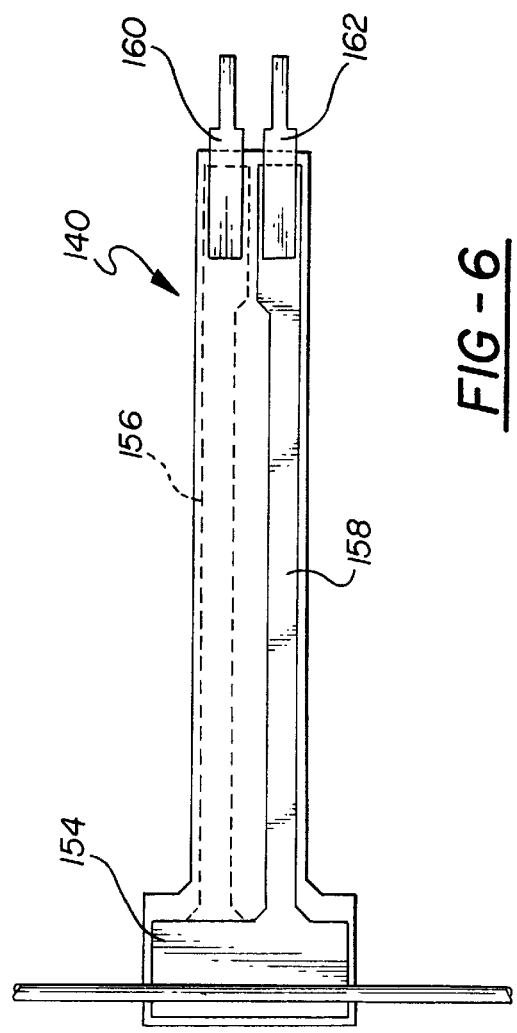

MAGNETOSTRICTIVE WAVEGUIDE POSITION MEASUREMENT APPARATUS USING PIEZOELECTRIC SENSOR

CROSS-REFERENCE TO RELATED APPLICATION

This application is related to copending application "Position Measurement Apparatus using Wire Waveguide in Shock Resistant Suspensions," filed Mar. 12, 1996, Ser. No. 08/615,489, in the name of John D. Begin and assigned to Patriot Sensors and Controls, Inc.

BACKGROUND OF THE INVENTION

1. Field of the Invention

This invention relates to position measurement apparatus of the type utilizing a magnetostrictive wire waveguide which extends through a measurement field and in which the position of a movable element within the field is determined as a function of the propagation times of sonic disturbances along the waveguide.

2. Description of the Art

The use of a magnetostrictive wire waveguide to measure the position of a moveable element such as a machine tool component or a float is described in the prior art including, by way of example, U.S. Pat. No. 4,839,590. In general, the magnetostrictive wire waveguide extends through the measurement field and cooperates with a toroidal "user" magnet which is moveable along and in surrounding relationship to the waveguide, the position of the user magnet being related to the position of a quantity or component being monitored. Although the specific manner of using a magnetostrictive waveguide as a position transducer may vary, the measurement function in all cases involves a determination of the time required for a sonic disturbance to propagate along the waveguide from a fixed position at or near one end of the waveguide to the user magnet or vice versa. Since the propagation speed is known, distance can be determined as a function of time.

The pickup element or sensor mounted at one end of the magnetostrictive has been provided in many different forms. Electromagnetic sensors, such as coils, as well as piezoelectric sensors have been used to detect the sonic strain pulse traveling along the magnetostrictive waveguide. As shown in U.S. Pat. Nos. 4,839,590; 4,943,773 and 5,473,245, a piezoelectric crystal is securely mounted in contact with the magnetostrictive waveguide wire by means of damping pads and various mechanical fastener means. U.S. Pat. No. 5,473,245 discloses that it is known to mount two piezoelectric material plates on opposite sides of the magnetostrictive wire. The opposite faces of these plates are then bonded to a housing or other stable mounting structure to enable the piezoelectric plates to detect the torsional movement of the wire. This patent also discloses the use of a circumferentially closed cylindrical piezoelectric element formed of a plurality of separate radial piezoelectric segments which are interconnected to establish a circumferential polarization.

Despite the prior usage of piezoelectric sensors as pickup elements in magnetostrictive transducers or position measuring devices, there is still a need for a piezoelectric sensor usable in a magnetostrictive waveguide position measuring device which has improved sensitivity; which can be provided in different configurations for use in many different applications, and which reduces transients, EMI, noise, and signal ringing. It would also be desirable to provide a piezoelectric sensor which can be coupled to amplifiers in charge mode or voltage mode to further reduce noise and capacitive effects in calling between the piezoelectric sensor and a removably located receiver.

SUMMARY OF THE INVENTION

The present invention is a magnetostrictive waveguide position measuring apparatus which uses a magnet displaceable along a measuring area of a magnetostrictive waveguide anchored at opposite ends. An excitation signal is transmitted along the waveguide. The magnet induces a torsional strain along the waveguide in response to the excitation signal, with the torsional strain being transmitted back along the waveguide to a piezoelectric film element, or sensor coupled to one end of the waveguide.

In one embodiment, the position measurement apparatus includes a magnetostrictive waveguide extending through a measurement field and anchored at opposite ends, means for electrically exciting the waveguide to send an electrical excitation signal along the waveguide, a magnet displaceable along the waveguide and inducing a torsional strain signal in the waveguide in response to the excitation signal, and signal means for producing a signal representative of the position of the magnet along the waveguide. The apparatus also includes a piezoelectric film element having an active area with a first axis oriented along a direction of stretch of the piezoelectric element and a second axis transverse to the first axis. The active area of the piezoelectric film element disposed in contact with the waveguide is aligned along the second axis of the piezoelectric film element, with the torsional strain signal transmitted along the waveguide and coupled to the piezoelectric film element to produce a stress wave in the piezoelectric film element in the direction of the first axis of the piezoelectric film element.

Preferably, the piezoelectric film element is coupled to the waveguide at a position away from the center of the active area of the piezoelectric element. Further, the piezoelectric film element preferably has a length along the second axis that is substantially one half the wavelength of the excitation signal on the waveguide. In addition, the center of the active area of the piezoelectric film element is preferably disposed at a position one quarter of the signal wavelength from the end anchor to reduce any transient signal tail.

In another embodiment, first and second piezoelectric film elements are electrically differentially connected out of phase such that the first and second piezoelectric film elements contacting the waveguide are stressed in opposite modes.

The outputs of the first and second piezoelectric film elements are connected to either an amplifier arranged in charge mode or an amplifier arranged in voltage mode. In one application, the first and second piezoelectric film elements are connected differentially so as to maximize signal amplitude when the first and second elements are coupled to an amplifier arranged in voltage mode through series, out of phase wiring of the two elements. Alternately, the first and second piezoelectric film elements may be connected differentially so as to maximize signal amplitude when the first and second elements are coupled to an amplifier arranged in charge mode through parallel, out of phase wiring of the first and second piezoelectric film elements.

In another embodiment, the first and second piezoelectric film elements are dimensionally offset to be stressed on the same mode and electrically connected in parallel and in phase. In this embodiment, transient signals are minimized by placing a grounded side of each of the first and second film elements against the waveguide. Output signal amplitude is maximized when the first and second elements are coupled to amplifier arranged in charge mode.

The magnetostrictive waveguide position measuring apparatus of the present invention utilizes a unique piezoelectric film element which is coupled to the waveguide for maximum signal amplitude thereby increasing the detection accuracy of the apparatus. In addition, the piezoelectric film element provides a unique reduction in electrical noise effects that result from transient signals, noise or EMI as compared to inductive coil pick-ups extensively used in previous magnetostrictive position measuring apparatus.

Coupling the output of the piezoelectric film element to an amplifier in charge mode further reduces these noise, transient or EMI effects as well as reducing the capacitance and noise effects in any associated cabling between the piezoelectric film element and a remotely located receiver or amplifier. This enables the amplifier as well as the other signal processing electronics to be located remote from the waveguide rather than directly on one end of the waveguide.

BRIEF DESCRIPTION OF THE DRAWINGS

The various features, advantages, and other uses of the present invention will become more apparent by referring to the following detailed description and drawing in which:

FIG. 5 is a plan view of a typical construction of a differential piezoelectric element according to the present invention;

FIG. 6 is a plan view of an assembled differential piezoelectric element using both element portions shown in FIG. 5;

DESCRIPTION OF THE PREFERRED EMBODIMENT

Figure 1:
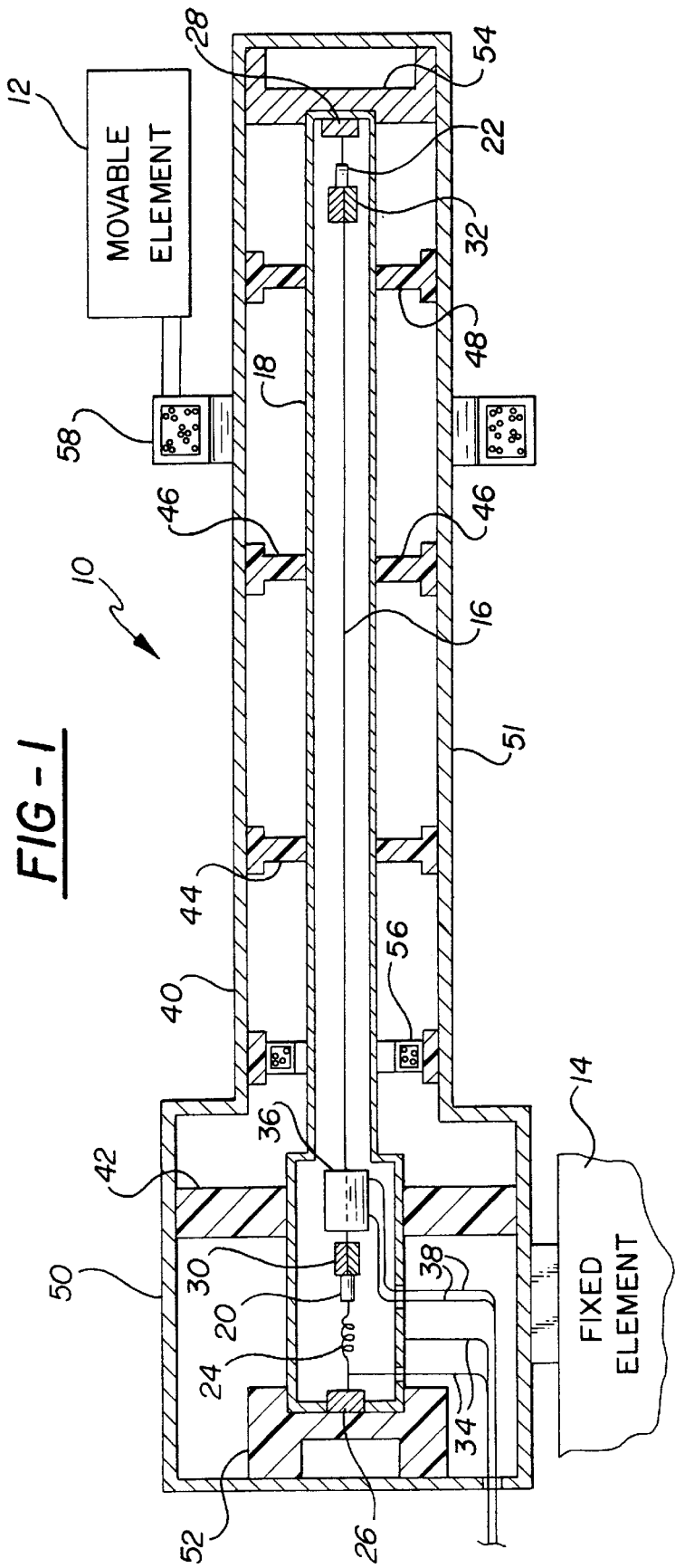
FIG. 1 is a cross-sectional view of a wire waveguide position measurement apparatus incorporating a piezoelectric element pickup according to the present invention.

Referring to FIG. 1, there is shown a magnetostrictive wire waveguide type position measurement apparatus 10 for determining the position of a moveable element 12 relative to a fixed or reference element 14. It will be appreciated that the moveable and fixed elements 12 and 14 are representative of wide variety of elements, components or quantities associated with various specific applications; by way of example, the moveable element 12 may be a metal cutter mounted and powered to move linearly relative to the frame of a machining center, such frame being represented by fixed element 14. The movable element may also represent a blade or shovel of an earth moving machine which is controllable as to position relative to the frame of the vehicle, said frame being represented by the fixed element 14. Still other possibilities will be apparent to persons skilled in the various arts.

Measurement apparatus 10 comprises a magnetostrictive wire waveguide 16 in the form of a substantially uniform, 0.025 " diameter nickel iron alloy wire extending linearly and under tension through a measurement field ranging from a few inches to hundreds of feet. Wire waveguide 16 is mounted concentrically within a 0.125 " outer diameter brass tube 18 by way of shackles 20 and 22. Shackle 20 is used as a coupling between the wire waveguide 16 and a compression spring 24 which in turn is secured to an anchor 26, the spring serving to apply appropriate tension to the waveguide essentially to maintain its physical straightness through the interior of the brass tube 18; i.e., the tension applied to the tube is essentially unrelated to the propagation speed of sonic impulses therethrough as hereinafter discussed. Shackle 22 also serves as a coupling between the wire waveguide 16 and a connecting element which is secured to the brass tube by anchor 28. The wire waveguide 16, the shackles 20 and 22, the spring 24 and the brass tube 18 are all conductive so that an electrical circuit is established between terminals on the ends of signal input wires 34 which are connected to electronics described hereafter. Reflection damping pads 30 and 32 of silicon rubber or other appropriate resilient material are clamped about the terminal ends of the wire waveguide 16 for reflection damping purposes as is better described below with reference to FIG. 2. A pick-up element 36 surrounds the uniform portion of wire waveguide 16 near the left terminal end as shown in FIG. 1 and is connected by conductive wires 38 to the electronics.

The arrangement and dimensions given above are examples only. The waveguide, for example, need not be linear but may be curved to accommodate a given measurement field.

The brass tube 18 containing the waveguide 16 is resiliently mounted within a steel outer housing 40 having a head 50 and a body 51 of generally tubular configuration by means of washer or disk shaped suspension components 42, 44, 46, and 48 of silicon rubber or other resilient material. Rubber acoustic dampening end structures 52 and 54 are provided between the ends of the brass tube 18 and the ends walls of the steel housing 40 to provide resilient suspension in the axial or longitudinal direction. The material and physical properties; i.e., the shape, density and resilience of the acoustic dampening suspension system components 42, 44, 46, 48, 52, and 54 can be chosen to filter out or dampen shock inputs in almost any selected frequency range which is expected in the environment of use. As a general proposition, the material of the suspension system components is chosen to filter out relatively high frequency shock inputs; e.g., those having a characteristic frequency above 200 hertz.

The configurations of the suspension system components in FIG. 1 are intended as examples for illustration only and it will be appreciated by those skilled in the applicable arts that other configurations can be chosen in accordance with the configuration of the anchoring and housing structures associated with a particular waveguide apparatus. In general, it is the objective of the suspension system to isolate the wire waveguide 16 from externally created or applied shock inputs along all three axes; i.e., the longitudinal axis and the radial axis. The effect of "floating" the wire waveguide 16 and its support tube 18 within the fixed external housing 40, however, requires special considerations insofar as position measurement accuracy is concerned as hereinafter described.

As mentioned above, the waveguide 16 serves as a transducer which extends under tension through the measurement field. For this purpose, a first toroidal magnet 56 is mounted within and to the internal cylindrical surface of the steel housing 10 at a point spaced longitudinally from but near the left end of the wire waveguide 16 as shown in FIG. 1; i.e., near the end at which the pick-up element 36 is located. Magnet 56 is preferably an electromagnet which is excited only when a measurement is underway. However, it may also be a permanent magnet and need not be within the housing 40. In all cases, however, magnet 56 is a position "reference" magnet and is fixed relative to the measurement field.

A second toroidal permanent magnet 58, herein referred to as a "user magnet," is disposed around the cylindrical body 51 of the steel housing 40 in spaced relationship thereto and is moveable longitudinally or axially along the tube 40 and the wire waveguide 16 by virtue of being mechanically attached to the moveable element 12 the position of which is to be monitored. This mechanical connection can take a variety of forms as described briefly above. The advantages of the shock filtering suspension system are, of course, greatest in environments which involve a likelihood of shock or vibration.

In general, the operation of the device shown in FIG. 1 entails the application of a current pulse to the wire waveguide 16 by way of input wires 34. This current pulse reacts to the magnetic fields created by the reference and user magnets 56 and 58, respectively, to create essentially simultaneous sonic disturbances or impulses in the wire waveguide which propagate linearly in both directions. The pick-up element 36 receives the sonic disturbance from the reference magnet 56 first in time. The pick-up element 36 receives the sonic disturbance associated with user magnet 58 second in time, the interval between the arrival of the impulse from reference magnet 56 and the arrival of the pulse from user magnet 58 being a function of the axial position of magnet 58 along the outside surface of the tube 40. Because sonic propagation speed in waveguide 16 is known, the time between the arrivals of the pulses is an indication of the position of the moveable element 12 relative to the magnet 56 and the fixed element 14 on which the housing 40 is carried. Using apparatus and methods hereinafter described, the exact length of the time interval is determined and the position of the moveable element 12 is either recorded or displayed, the term "display" being used herein to represent any effective utilization of the position signal output.

The physical configuration of the wire waveguide 16 and particularly the left and right terminal ends thereof are shown in detail. The wire waveguide which, as mentioned above, can be effectively any desired length, is nominally of circular or round cross-section throughout the measurement field. However, to reduce the amplitude of the reflections of sonic disturbances propagating along the waveguide from the terminal ends thereof, the left and right terminal portions which lie outside of the measurement field; e.g., end portions of approximately 1"–3 " in length, may be mechanically physically altered in section into a gradually flattened and widened shape. These terminal end portions are attached, such as by soldering, to the end surfaces of the conductive shackles 20 and 22. Obviously, other attachment mechanicals can be employed. It has been found that a gradual rather than an abrupt change in waveguide wire configuration reduces the tendency of the waveguide material to reflect sonic disturbances propagating along the wire. The term "gradual" means that the cross-sectional shape change occurs over a length which is larger than and, typically, a multiple of the nominal wire diameter. Moreover, the change from a circular or round configuration to a flat, widened, essentially rectangular configuration over a distance which is large relative to the diameter of the wire changes significantly the surface area to volume ratio of the wire material and provides a large surface area for physical contact with pads 30 and 32 at the left and right terminal ends of the wire 16, respectively. The pads 30 and 32 are suitably clamped into a contacting configuration which sandwiches the flattened portions of the wire waveguide 16 therebetween. The result is a substantial reduction in sonic reflection at the terminal ends and a simplification of the signal processing circuitry as hereinafter described. The shape transition of the terminal ends of the waveguide 16 has been found to provide reflection dampening ratios of up to 100:1 as compared with prior art anti-reflection techniques which provide ratios of only about 20:1. Moreover, the flattened sections have been found to be far less sensitive to clamping pressure and, therefore, give rise to relaxed construction requirements and greater uniformity in product performance. The pick-up element 36 is spaced far enough from left end of waveguide 16 to be around the uniform 0.025 " diameter portion thereof.

Figure 2:
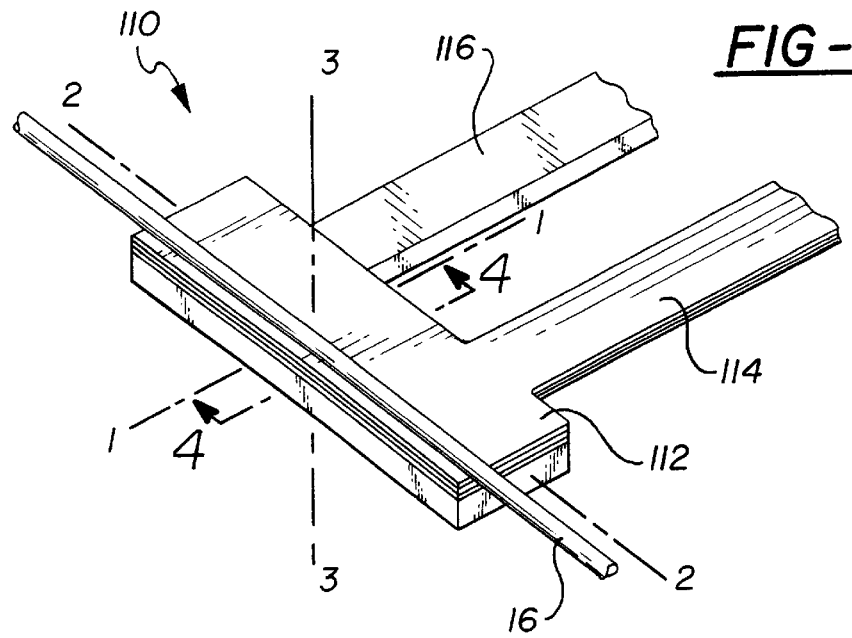
FIG. 2 is a perspective view of one embodiment of the piezoelectric element of the present invention.
Figure 3:
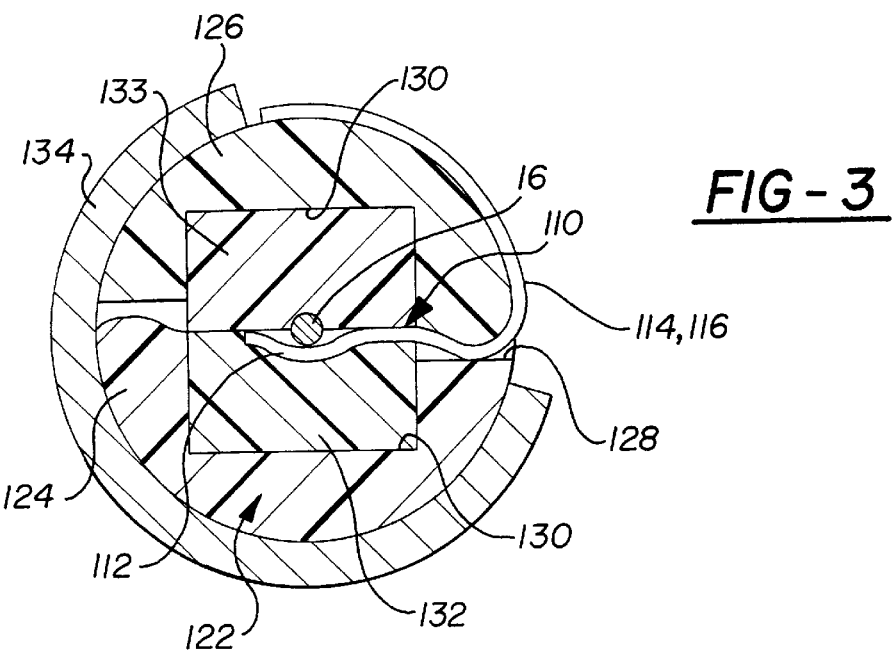
FIG. 3 is a cross-sectional view of the piezoelectric element shown in FIG. 2 disposed in a wire mount.
Figure 4:
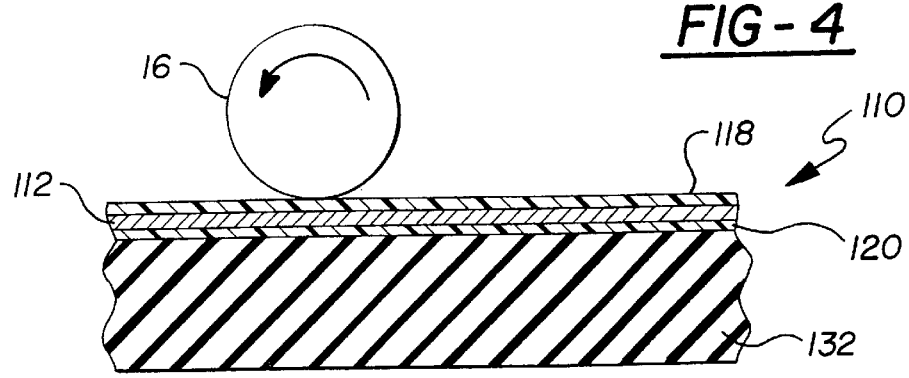
FIG. 4 is an enlarged view of the piezoelectric element shown in FIGS. 2 and 3.

As shown in FIGS. 2–4, in a preferred embodiment, the pick-up element 36 is formed of a piezoelectric film sensor denoted by reference number 110. The piezoelectric element 110 is made of a suitable piezoelectric material, such as flexible Kynar film, that has been stretched, annealed, and polarized under the influence of an applied DC voltage. Suitable film-type piezoelectric film sensors are available from AMP, Incorporated of Valley Force, Pa.

Piezoelectric element 110 is formed with an active area 112 of generally polygonal configuration, such as rectangular, square, etc. As is conventional, the active area 112 has a positive surface on one side and a negative surface on the opposite side. A pair of elongated tails or legs 114 and 116 extend from the active area 112, with leg 114 extending from the positive surface and leg 116 extending from the negative surface. Suitable terminal connections, not shown in FIG. 2, are mounted on the ends of the legs 104 and 106 to provide connection to the remote electronics, as described hereafter.

In accordance with standard crystallographic notation, the active area 112 has three mutually exclusive axes extending therethrough. Length axis 1 extends in the direction of stretch of the piezoelectric element 110. A width axis denoted by reference number 2 extends transverse or generally perpendicular to the length axis 1. A thickness axis 3 extends perpendicular to the axes 1 and 2.

According to a preferred embodiment of the present invention, the piezoelectric element 110 is oriented such that the wire 16 contacts the active area 112 of the piezoelectric element 110 perpendicular to the 1 axis and generally parallel to or along the 2 axis. This takes advantage of the differing charge constants along the various axes of the piezoelectric element 110. In this orientation, longitudinal strain pulses which travel along the waveguide wire 16 at a speed different from that of the torsional pulses stress the piezoelectric element or film 110 in the 2 axis and are attenuated by a factor of 10 or more; while the torsional pulses stress the film in the 1 axis and can be easily detected without significant attenuation.

Further, it is preferred that the waveguide wire 16 contact the active area 112 near the edge of the active area 112 and not at or close to the center of the active area 112. If the waveguide wire 16 is placed in the center of the active area 112 of the piezoelectric element 112, torsional motion will cause material on one side of the wire 16 to be tensioned, and an equal amount of material on the other side of the wire 16 to be compressed. The opposite voltages produced by the opposite strain modes will tend to cancel and reduce the output signal from the piezoelectric element 110. Placing the wire 16 parallel to the 2 axis and close to, but spaced from the outer edge of the active area 112 overcomes this problem.

As shown in FIGS. 3 and 4, in a preferred embodiment, the active area 112 as well as the legs 114 and 116 are coated on both exterior surfaces with a protective layer formed of a suitable non-conductive material such as Mylar, acrylic, etc. The protective layers are denoted by reference numbers 118 and 120 in FIG. 4.

It is necessary that the piezoelectric element 110 be securely and fixedly coupled to the wire 16. One embodiment of a suitable mount is shown in FIG. 3. A clamshell 122 has a generally cylindrical configuration with a circular cross-section. The clamshell 122 is formed of first and second halves 124 and 126. The first and second halves 124 and 126 may be separate or joined together by means of a hinge along one edge. An aperture or slot 128 extends between one side portion of the halves 124 and 126 to provide an opening for the legs 114 and 116 of the piezoelectric element 110.

Each of the halves 124 and 126 has an internal recess denoted by reference number 130 in FIG. 3. The recess 130, by example only, has a generally cubical cross-section when the first and second halves 124 and 126 are closed together to form an internal cavity sized to receive a generally cubical damping member 132, such as a silicone rubber pad. The damping member 132 also has a slot extending therethrough which communicates with the slot 128 between the clamshell halves 124 and 126 to allow exit of the legs 114 and 116 of the piezoelectric element 110 therefrom.

As shown in FIG. 3, the damping member 132 has a longitudinally extending bore through which the waveguide wire 16 extends. The active area 112 of the piezoelectric element 110 is disposed within a recess at the interface of two damping members 132 in secure contact with the wire 16. The damping members are preferably pre-compressed so as to exert a clamping force on the piezoelectric element 112 to maintain the piezoelectric element 112 in secure engagement with the wire 16.

An external clamp member 134, such as a steel band having a generally C-shape, is snapped about the joined, closed clamshell halves 124 and 126 to maintain the clamshell halves 124 and 126 together about the damping members 132 and 133.

The torsional strain pulse on the magnetostrictive waveguide wire 16 produces a sine wave of about 3 periods at a frequency of 100 Khz that expands and decays within an envelope. The first major positive lobe is the desired point for triggering a comparator to detect the arrival of the torsional strain pulse. The first major positive lobe is the strongest and most consistent lobe for use as the triggering signal. The first major positive lobe approaches a maximum value as the length or dimension of the piezoelectric film element 110 along the two axes approaches one half of the signal wavelength or about one half inch at a signal frequency of 100 Khz. A piezoelectric film element 110 that is merely one half inch long, assuming a signal frequency of 100 Khz will have less signal ring than shorter length film since more material is in contact with the waveguide wire 16 to act as a damp thereon.

In operation, the strain pulse in the waveguide wire 16 is reflected off of an end anchor which is preferably placed near the piezoelectric element 110. The reflected pulse is of opposite polarity from the original strain pulse. In a preferred embodiment, the center of the active area 112 of the piezoelectric element 110 is placed at a distance of approximately ¼ of the signal wavelength, or about ¼ inch at a 100 Khz signal frequency, from the anchor to produce a cancellation effect on the signal tail.

Further, the waveguide wire 16 is preferably grounded at the end anchor adjacent to the piezoelectric film element 110. This reduces the electric fields at the piezoelectric film element 110 and reduces a transient induced in the signal amplifier from the transmitted current pulse.

Referring now to FIGS. 5 and 6, there is depicted a preferred embodiment of constructing a differential piezoelectric sensor 140. The differential piezoelectric element 140 is formed of a pair of identical sections denoted by reference numbers 142 and 144. The following discussion with respect to section 142 will be understood to apply equally to the opposite section 144. The first piezoelectric element section 142 is formed of a 110 μM piezoelectric film metalized with silver ink and annealed at 105° C. The entire section 142 is coated with an acrylic coating as described above and shown in FIG. 4. The piezoelectric section 142 has an active area 146 with opposed positive and negative surfaces. A first positive leg 148 extends from the positive surface of the active area 146; while a second or negative polarity leg 150 extends from the opposed negative surface of the active area 146. The first and second legs 148 and 150 are disposed on opposite sides of an insulative adhesive backed Mylar support surface 152.

FIG. 5 depicts the first and second sections 142 and 144 being formed together as a single elongated assembly. It will be understood that each of the sections 142 and 144 may be separately formed and joined together as described hereafter.

For clarity, the second section 144 of the differential piezoelectric element 140 also has an active surface area 154 with opposed positive and negative surfaces. A first positive leg 156 extends from the positive surface; while a second negative polarity leg 158 extends from the negative surface of the active area 154.

If the sections 142 and 144 are constructed in the manner shown in FIG. 5 on a single substrate, the two halves 142 and 144 are separated and then juxtaposed with the positive surfaces of the active areas 146 and 154 disposed opposite each other.

As shown in FIG. 6, suitable terminal connections 160 and 162 are mounted on the ends of the first and second legs 148, 152, 156 and 158 of the sections 142 and 144. The terminal connections 160 and 162 are preferably crimp-type terminals which are crimped through both layers of the sections 142 and 144 to join the first positive leg 148 to the second negative leg 158 by terminal connector 162 and the second negative polarity leg 150 and the first positive leg 156 by the terminal connector 162. In this manner, while the terminal connectors 160 and 162 fixedly join the respective ends of the legs 148, 150, 156 and 158, the active areas 146 and 154 of the two sections 142 and 144 can be separated to enable the waveguide wire 16 to be disposed therethrough, as shown in FIG. 6, generally parallel to the 2 axis of both sections 142 and 144.

Figure 7:
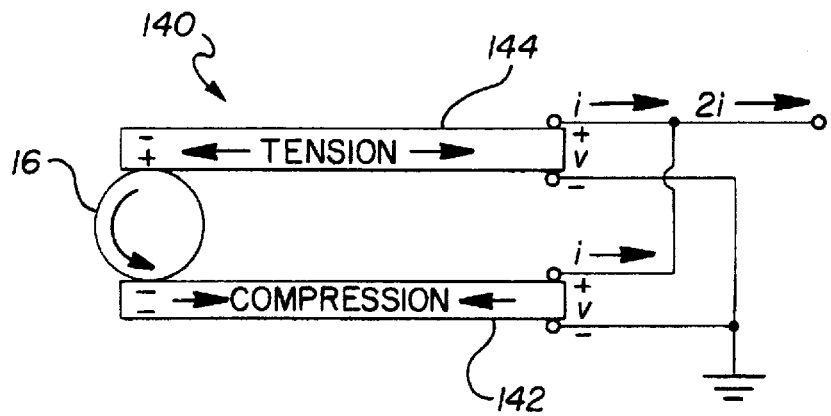
FIG. 7 is a side elevational view of a differential, out-of-phase piezoelectric element of the present invention wired for current doubling.

The differential piezoelectric element 140 described above and shown in FIGS. 5 and 6 may be connected in charge mode with differential parallel wiring connections for a magnetostrictive waveguide 16 as shown in FIG. 7. The waveguide wire 16 is sandwiched between the active areas 146 and 158 of the two sections of the piezoelectric element 140. Torsional strain on the wire 16 causes one element or section 142 to be compressed; while the other element or section 144 is tensioned. Due to the wiring connections described above implemented via the wire terminal connectors 160 and 162, the positive and negative legs 148, 150, 156 and 158 of the two sections 142 and 144 are electrically connected as shown in FIG. 7 to produce a doubling of output current.

The differential mode connection shown in FIG. 7 connects the two piezoelectric sections 142 and 144 out of phase. Stresses or induced noise that are present in both sections 142 and 144 cancel; while stresses that are of opposite mode will add.

As the longitudinal strain is along the 2 axes of both sections 142 and 144, the longitudinal strain is a common mode for both sections 142 and 144. This yields further longitudinal attenuation due to the differential common mode cancellation. Other unwanted signals, such as noise caused by shock, vibration or EMI, are also attenuated by the differential cancellation.

Figure 8:
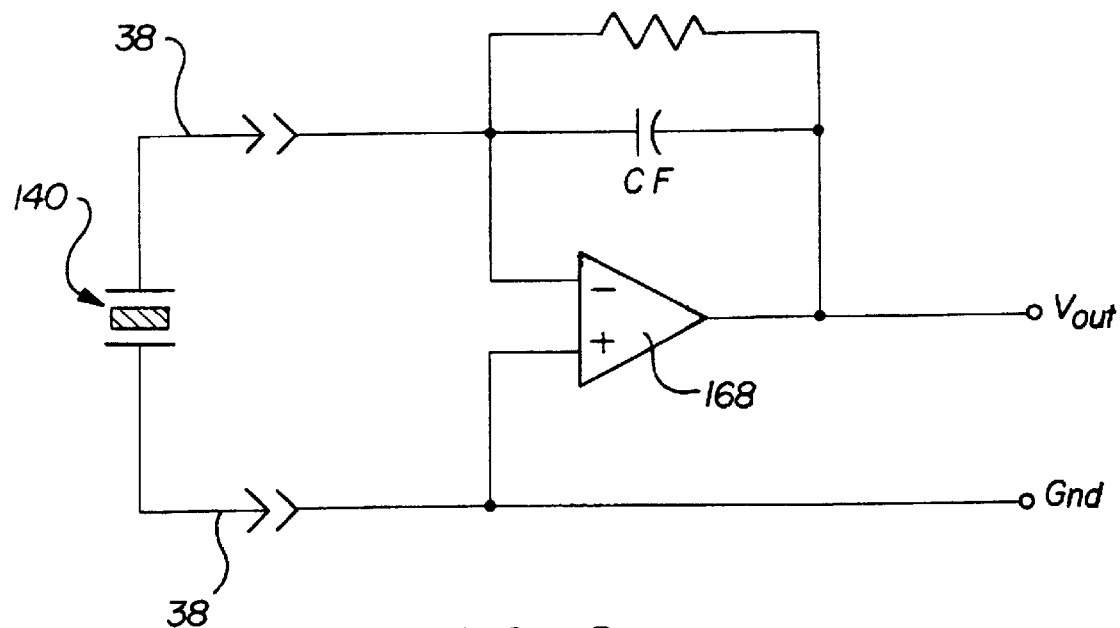
FIG. 8 is a schematic diagram of a charge mode amplifier connected to the output of the piezoelectric element shown in FIG. 7.

A charge mode amplifier 168 connected as shown in FIG. 8 to the output of the piezoelectric element 140 can take advantage of the current doubling produced by the piezoelectric element wiring configuration shown in FIGS. 5, 6 and 7 and described above. In FIG. 8, the voltage output of the charge amplifier 168 is determined by Q/Cf where Q is the charge developed on the piezoelectric element 140 and Cf is the feedback capacitance of the charge amplifier 168. Thus, the output voltage of the charge amplifier depends on the feedback capacitance, and not the input capacitance. This indicates that the output voltage of the charge amplifier 168 is independent of cable capacitance which enables a long cable to be used between the piezoelectric element 140 and the signal electronics described hereafter as is necessary in the headless magnetostrictive waveguide shown in FIG. 1 wherein the signal processing electronics are separated or remote from the piezoelectric element 140 by a considerable distance.

Figure 9:
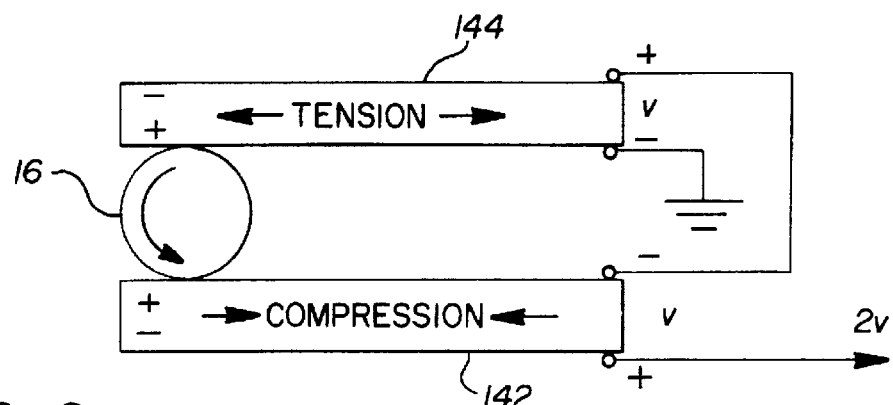
FIG. 9 is a side elevational view of a differential, series connected piezoelectric element of one embodiment of the present invention.
Figure 10:
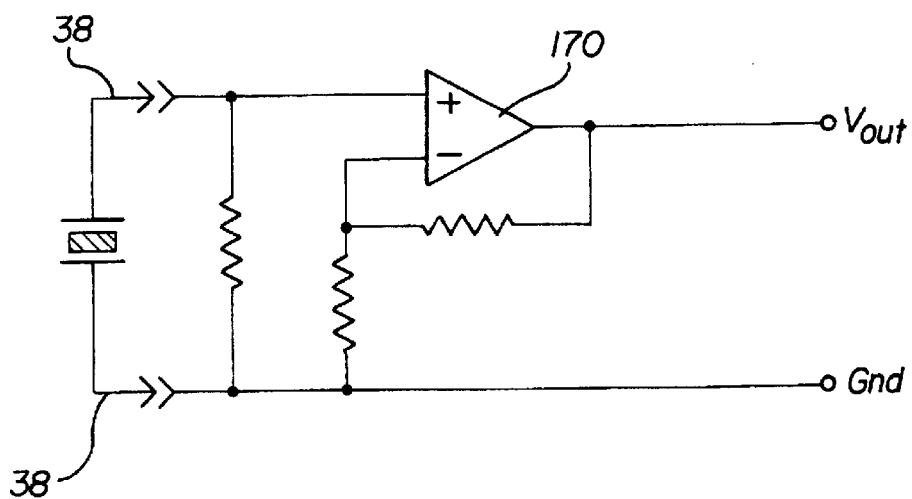
FIG. 10 is a schematic diagram of a voltage mode amplifier connected to the output of the piezoelectric element show in FIG. 9.

As shown in FIG. 9, the sections 142 and 144 of the piezoelectric element 140 may be connected in series. In this case, the voltage, and not the current, is doubled. FIG. 10 illustrates a voltage mode amplifier 170 which can take advantage of the voltage doubling by the wiring configuration shown in FIG. 9. The voltage mode amplifier 170 has a significant advantage with respect to temperature since the torsion signals produced from the sonic pulse on the wire 16 will not attenuate as much with temperature drops. This results from lower temperatures causing lower dielectric constants in the piezoelectric element 140 and therefore lower capacitance. The negative effect of use of a voltage mode amplifier 170 is less immunity to EMI because of the higher impedance circuit. Waveguide ringing is another disadvantage and results from less current and therefore less power generated by the piezoelectric element 140.

Figure 11:
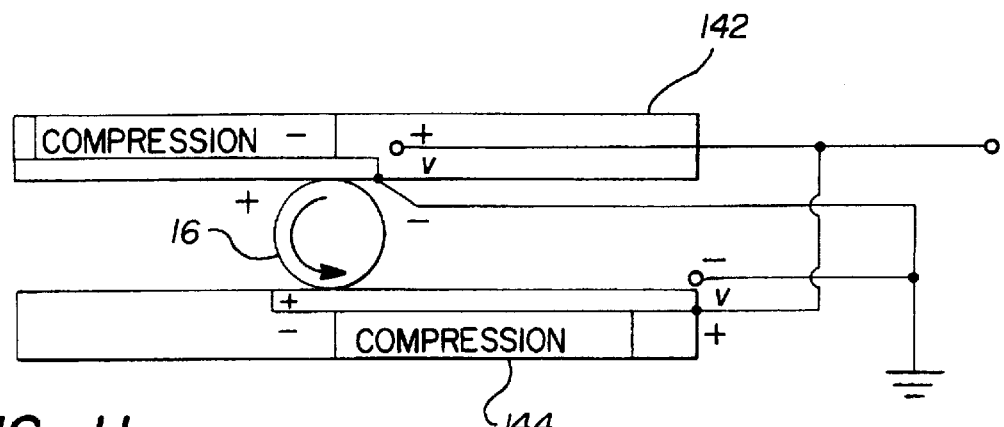
FIG. 11 is a side elevational view of another piezoelectric element arrangement utilizing differential wiring of two piezoelectric film elements excited in opposite modes.

The first and second sections 142 and 144 may also be excited in opposite modes as shown in FIG. 11. In this configuration, the active areas of the piezoelectric sections 142 and 144 are laterally offset so as to generate the same mechanical strain; i.e., compression, in both sections 142 and 144. In this embodiment, transient signal reduction is increased since the surface of the active area of both sections 142 and 144 have their ground side in contact with the waveguide wire 16.

A conventional signal processing apparatus, not shown, but remote from the device produces position signal outputs. The signal processing circuitry includes appropriate signal conditioning circuitry apparent to those skilled in the electronics arts to receive the input signal on wires 34 which is used to excite the wire waveguide 16 as previously described. The circuitry is connected to receive as inputs the pulses which are generated in pick-up elements 36, 110 and 140 as coupled through the amplifiers 168 or 170, as the sonic disturbances from the magnets 56 and 58 propagate along the wire waveguide 16 from right to left as shown in FIG. 1. The signal processing described herein can be accomplished with electronics or a digital computer; for example, hardwired, analog devices can be used. The terms "computer" and "microprocessor," as used herein, are not to be construed only to describe digital or even programmable devices.

Further details concerning the construction of a suitable signal processing apparatus can be had by referring to U.S. patent application Ser. No. 08/615,489, the contents of which are incorporated by reference.

What is claimed is:

1. A position measurement apparatus including a magnetostrictive waveguide extending through a measurement field and anchored at opposite ends, means for electrically exciting the waveguide to transmit an electrical excitation signal along the waveguide, a magnet displaceable along the waveguide and inducing a torsional strain signal in the waveguide in response to the excitation signal, and signal means for producing a signal representative of the position of the magnet along the waveguide, the apparatus comprising:

a piezoelectric film element having an active area with a first axis oriented along a direction of stretch of the piezoelectric element and a second axis transverse to the first axis;

the active area of the piezoelectric film element disposed in contact with the waveguide, with the waveguide aligned along the second axis of the piezoelectric film element; and the torsional strain signal transmitted along the waveguide and coupled to the piezoelectric film element to produce a stress wave in the piezoelectric film element in the direction of the first axis of the piezoelectric film element.

2. The position measurement apparatus of claim 1 further comprising:

the active area of the piezoelectric film element having a center extending along the second axis;

the waveguide contacting the active area of the piezoelectric film element at a position spaced from and parallel to the center.

3. The position measurement apparatus of claim 1 further comprising:

the length of the active area of the piezoelectric film element along the second axis equal to substantially one half the wavelength of the excitation signal transmitted on the waveguide.

4. The position measurement apparatus of claim 1 wherein:

the active area of the piezoelectric film element has a length extending along the first axis equal to substantially one half the wavelength of the torsional strain induced in the active area of the piezoelectric film.

5. The position measurement apparatus of claim 1 wherein:

the center of the active area of the piezoelectric film element is spaced substantially one quarter of the wavelength of the excitation signal from an end anchor on the waveguide.

6. The position measurement apparatus of claim 1 wherein:

the piezoelectric film element is flexible.

7. The position measurement apparatus of claim 1 further comprising:

means for mounting the piezoelectric film element to the waveguide, the mounting means including;

resilient pads surrounding the waveguide and the piezoelectric elements; and means for compressibly coupling the pads together.

8. The position measurement apparatus of claim 7 wherein the compressibly coupling means comprises:

an outer shell surrounding the pads; and a clamp compressively engaged with the shell.

9. The position measurement apparatus of claim 7 wherein:

the pads are pre-compressed.

10. The position measurement apparatus of claim 1 wherein the piezoelectric film element comprises:

first and second piezoelectric film elements contacting the waveguide;

the first and second piezoelectric film elements electrically connected differentially out of phase so as to be stressed in opposite modes.

11. The position measurement apparatus of claim 10 wherein:

the first and second piezoelectric film elements are electrically connected in parallel to substantially double the output current therefrom.

12. The position measurement apparatus of claim 11 further comprising:

an amplifier connected in charge mode; and an output of the piezoelectric film element connected to an input of the amplifier.

13. The position measurement apparatus of claim 10 wherein:

the first and second piezoelectric film elements are connected in series to substantially double the output voltage thereof.

14. The position measurement apparatus of claim 13 further comprising:

an amplifier connected in voltage mode;

an output of the piezoelectric film element connected to an input of the amplifier.

15. The position measurement apparatus of claim 1 further comprising:

the piezoelectric film element including first and second piezoelectric film elements dimensionally offset so as to be stressed in the same mode;

the first and second piezoelectric film elements electrically connected in parallel and in phase;

one ground surface of each of the first and second piezoelectric film elements contacting the waveguide;

an output of the first and second piezoelectric film element coupled to an amplifier connected in charge mode.

16. The position measurement apparatus of claim 10 wherein:

each of the first and second piezoelectric elements is flexible.

* * * * *